(No Model.)
J. H. & C. COOK.
DETACHABLE HANDLE FOR PICKS.
No. 302,108. Patented July 15, 1884.
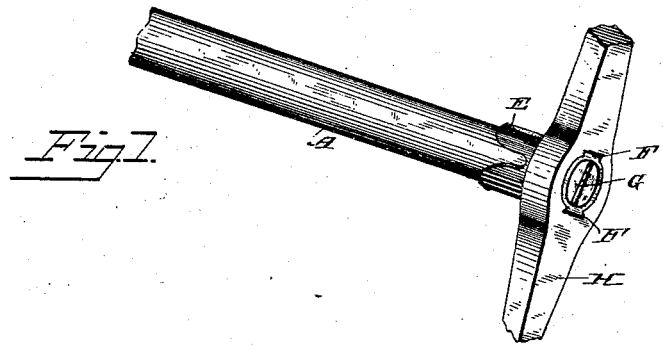
Fig. 1.
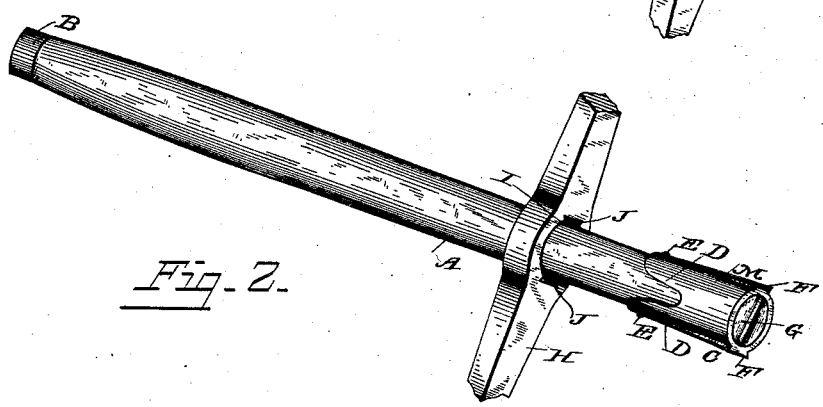
Fig. 2.
Fig. 3.
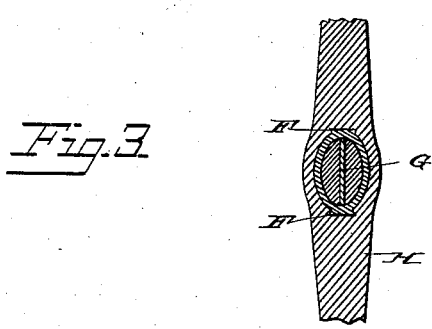
Fig. 4.
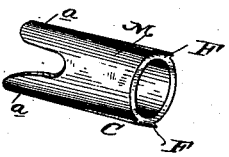
WITNESSES
C. W. Dashiell.
E. G. Siggers.
John H. Cook
Cornelius Cook
INVENTORS
by C. A. Snow & Co,
Attorneys

UNITED STATES PATENT OFFICE.

JOHN H. COOK AND CORNELIUS COOK, OF DRIFTON, PENNSYLVANIA.

DETACHABLE HANDLE FOR PICKS.

SPECIFICATION forming part of Letters Patent No. 302,108, dated July 15, 1884.

Application filed April 10, 1884. (No model.)

*To all whom it may concern:*

Be it known that we, JOHN H. COOK and CORNELIUS COOK, citizens of the United States, residing at Drifton, in the county of Luzerne and State of Pennsylvania, have invented a new and useful Detachable Handle for Picks, &c., of which the following is a specification, reference being had to the accompanying drawings.

This invention relates to fastenings for tool-handles; and it has for its object to provide a detachable handle for picks, axes, hatchets, and the like, whereby the handle may be applied with ease, and is securely held from accidental displacement.

With this object in view the said invention consists in certain details of construction and combination of parts, as hereinafter set forth, and particularly pointed out in the claim.

In the accompanying drawings, Figure 1 is a perspective view showing my improved fastening as applied to the handle of a pick. Fig. 2 is a perspective view showing the handle detached or separated from the pick. Fig. 3 is a longitudinal sectional view of Fig. 1. Fig. 4 is a detail view of the fastening device.

Like letters refer to corresponding parts in the several figures.

Referring to the drawings, it will be seen that we have shown our improved fastening device applied to a pick; but it will be apparent that it may be used on an ax, hatchet, hammer, or similar tool, as found desirable.

In said drawings, A designates the handle of the pick, constructed of wood in the usual manner, one end of the handle having a ferrule, B, secured thereto, said ferrule serving to protect the handle when tapping on the end to separate the parts.

C designates our improved fastening device, the body M being approximately elliptical in cross-section, and wings D D extending rearwardly from the body of the device, and provided with perforations $a$, a bolt or pin, E, passing through the handle and perforations, so as to secure the fastening device in place. The body of the device is provided at its upper and lower portions with projections F, which extend longitudinally from end to end of the body, said projections being of a dovetail form, as shown. A wedge, G, is driven through the end of the tool-handle within the body, so as to cause the device to more tightly fit the end of the handle. The pick H is provided with the usual central opening, I, the upper and lower walls of said opening having grooves J, of a dovetail form. It will be seen that the projections F F gradually increase in height from end to end of the body, and the grooves J J of the pick likewise gradually increase in width, so that when the handle is driven in to the full extent it will be held securely from displacement.

The operation of our invention is obvious. The body M of the fastening device is secured to the end of the handle by means of the pin or bolt E, and the wedge G is then driven into or through the end of the handle to expand the wood, so that the device C will more tightly fit the handle. The handle may now be attached to the pick, the projection F of the device fitting within the groove J, and by tapping the end of the handle which projects through the opening I the parts are caused to assume the position shown in Fig. 1. When it is desired to separate the handle from the pick, a few taps against the ferrule B will cause the other end of the handle to loosen, so as to pass readily through the opening I, and thus the pick may be detached for sharpening purposes.

It will be seen that I may apply the improved fastening device shown to axes, hatchets, hammers, and other tools where it is desired to provide a simple and convenient method of securing the handle in place and for readily separating the parts when required. It will be further seen that we may simply employ a projection on the body of the fastening device, and do not limit ourselves to forming the projection of a dovetailed shape. It will also be seen that the increasing height of the projections F and the increasing width of the grooves J prevent the pick from slipping off after it has been adjusted to its proper position.

Our improved fastening device will be found of great utility for the purposes intended, and may be manufactured at a slight cost.

Having described our invention, we claim—

As an improvement in tool-handle fastenings, the combination, with the tool provided with a central opening and dovetail grooves in the upper and lower walls of the opening, of the handle having a cylindrical-shaped fastening device fitted over one end, wings D, extending rearwardly from the upper and lower portions of the device, screws or other fastening means securing the wings in place, dovetail projections extending longitudinally along the upper and lower faces of the device, and a wedge driven through one end of the handle, the projections F and grooves gradually increasing in size in an outward direction, as set forth.

In testimony that we claim the foregoing as our own we have hereto affixed our signatures in presence of two witnesses.

JOHN H. COOK.
CORNELIUS COOK.

Witnesses:
JAMES L. OWEN,
ALEXANDER M. ALLEN.